US006025286A

United States Patent [19]

[11] Patent Number: 6,025,286
[45] Date of Patent: *Feb. 15, 2000

Kawatsu et al.

[54] HEAT-SENSITIVE STENCIL SHEET

[76] Inventors: Yukio Kawatsu, 667-5, Heso, Ritto-cho, Kurita-gun Shiga-ken, 520-30; Kenji Kida, 702, Domiru Seta, 4-21, Ogaya 1-chome; Hideyuki Yamauchi, 11-4, Aoyama 2-chome, both of Otsu-shi, Shiga-ken, 520-21, all of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,924

[22] Filed: May 9, 1997

[30] Foreign Application Priority Data

| | | | |
|---|---|---|---|
| May 9, 1996 | [JP] | Japan | 8-114994 |
| Jun. 27, 1996 | [JP] | Japan | 8-167648 |

[51] Int. Cl.$^7$ .......... B32B 27/12

[52] U.S. Cl. .......... 442/287; 442/395; 428/913

[58] Field of Search .......... 442/395, 287; 428/913

[56] References Cited

U.S. PATENT DOCUMENTS

| | | | |
|---|---|---|---|
| 5,643,680 | 7/1997 | Osaki et al. | 428/480 |

FOREIGN PATENT DOCUMENTS

| | | |
|---|---|---|
| 0647533 | 4/1995 | European Pat. Off. . |
| 0683061 | 11/1995 | European Pat. Off. . |
| 1002512 | 1/1976 | Japan . |
| 1002513 | 1/1976 | Japan . |
| 7182495 | 11/1982 | Japan . |
| 8147396 | 9/1983 | Japan . |
| 4212891 | 8/1992 | Japan . |
| 4232796 | 8/1992 | Japan . |
| 6305273 | 11/1994 | Japan . |
| 7186565 | 7/1995 | Japan . |
| 8164683 | 6/1996 | Japan . |
| 0724947 | 8/1996 | Japan . |
| 9606722 | 3/1996 | WIPO . |

*Primary Examiner*—Christopher Raimund
*Attorney, Agent, or Firm*—Birch, Stewart, Kolasch & Birch, LLP

[57] ABSTRACT

A heat-sensitive stencil sheet comprises a fibrous support of polyester fibers, and a polyester film, wherein both the orientation parameter (R1) of the film and the orientation parameter (R2) of the fibers respectively obtained by laser Raman spectrometry are in a range from 3 to 10. A method for manufacturing such a heat-sensitive stencil sheet comprises thermally bonding an undrawn polyester film and a fibrous support of undrawn polyester fibers to form a laminate and then stretching the laminate, wherein, during the bonding or during the stretching, the film and the fibrous support of the laminate are heated at different temperatures, respectively.

10 Claims, No Drawings

HEAT-SENSITIVE STENCIL SHEET

TECHNICAL FIELD

The present invention relates to a heat-sensitive stencil sheet. In more detail, it relates to a heat-sensitive stencil sheet, to be perforated by a thermal head or laser beam, etc., particularly a heat-sensitive stencil sheet high in perforation sensitivity, clear in printed images and excellent in printing durability.

BACKGROUND ARTS

In heat-sensitive stencil printing, a stencil sheet with a thermoplastic resin film bonded to an ink-permeable porous support is used. The original image read by an optical sensor is sent as digital signals to a thermal head, and the heat of the thermal head melts the thermoplastic resin film, to perforate it, and printing ink exudes from the porous support through the holes formed by the perforation.

Conventionally known heat-sensitive stencil sheets have a structure in which a porous support such as tissue paper, nonwoven fabric or woven fabric formed by natural fibers, chemical fibers and/or synthetic fibers is bonded by an adhesive onto a thermoplastic resin film such as an acrylonitrile based film, polyester based film or vinylidene chloride based film (e.g., JP-A-51-002512, JP-A-51-002513, JP-A-57-182495, etc.).

In recent years, heat-sensitive stencil printings are improved by increasing the density of heating elements of the thermal head or reducing the energy necessary for the thermal head to precisely reproduce original prints, such as photographs, and shortening the stencil sheet making time, etc. In this connection, a stencil sheet higher in perforation sensitivity is in demand. On the other hand, a stencil sheet excellent in printing durability which is not deformed or broken even after printing a large number of sheets is in demand.

However, the conventional heat-sensitive stencil sheets present problems in that if the energy necessary for the thermal head is reduced, the film is perforated only insufficiently and forms white spots on a black solid area or makes fine characters blurred, and in that mass printing causes the stencil sheet to be wrinkled, or to be delaminated into the film and the support, or to be broken. The causes for the poor printability and printing durability of the conventional stencil sheets are considered to be that adhesive used for bonding the film and the porous support inhibits the film perforation and ink permeation, and that the water, organic solvent, etc. contained in the ink act on the adhesive, to lower its bonding strength.

To overcome the disadvantages of these conventional stencil sheets, various proposals have been made. For example, JP-A-58-147396 and JP-A-04-232790 propose to keep the amount of adhesive used as small as possible. Furthermore, as a method to avoid the use of an adhesive, JP-A-04-212891 proposes a heat-sensitive stencil sheet obtained by scattering and thermally bonding synthetic fibers onto one surface of a thermoplastic resin film. However, these methods were found to provide insufficient bonding strength, and to present a problem in that if it is attempted to obtain a sufficient bonding strength, the film is poorly oriented, to be insufficiently perforated, making it difficult to form a stencil as accurate as the original. Moreover, JP-A-06-305273 and JP-A-07-186565 disclose a stencil sheet obtained by thermally bonding a polyester film and polyester fibers respectively not stretched, and co-stretching them. The stencil sheet has sufficient bonding strength between the film and the fibrous support without using any adhesive, but does not have sufficiently good performance characteristics to obtain the highly sensitive and highly precise prints required in recent years.

The present invention addresses the above problems of known stencil sheets and seeks to provide a heat-sensitive stencil sheet excellent in film perforation sensitivity and printing durability.

SUMMARY OF THE INVENTION

The present invention provides a heat-sensitive stencil sheet comprising a laminate of a porous support of polyester fibers, and a polyester film, wherein both the orientation parameter (R1) of the film and the orientation parameter (R2) of the fibers respectively obtained by laser Raman spectrometry are in a range from 3 to 10.

The present invention also provides a method for manufacturing a heat-sensitive stencil sheet comprising the steps of thermally bonding an undrawn polyester film and a fibrous support of undrawn polyester fibers and then stretching the laminate, wherein, during at least one of the bonding and stretching steps, the film and the fibrous support of the laminate are heated at different temperatures, respectively, so that both the orientation parameter (R1) of the film and the orientation parameter (R2) of the fibers obtained by laser Raman spectroscopy are in a range of 3 to 10.

Since, in accordance with the invention, a stencil sheet high in film perforation sensitivity, good in ink permeability and stable in support strength can be obtained, the prints obtained using the stencil sheet have a highly precise and clear image, and the stencil sheet is excellent in printing durability.

DESCRIPTION OF THE PREFERRED EMBODIMENTS

Preferred embodiments of the invention will now be described.

The stencil sheet of the present invention is in a range from 3 to 10 in both the orientation parameter (R1) of the film and the orientation parameter (R2) of the fibers, for improved perforation sensitivity and printing durability. If the orientation parameter (R1) of the film is not in the above range, film perforation sensitivity declines, and if the orientation parameter (R2) of the fibers is not in the above range, printing durability declines.

The orientation parameter (R1) of the polyester film is preferably 3.5 to 10, more preferably 4 to 10. If the orientation parameter (R1) of the film is 3 to 10, the hot perforation by the thermal head can sufficiently shrink the film, and a stencil sheet excellent in perforation sensitivity can be obtained.

The polyester fibers are preferably 3.5 to 10, more preferably 4 to 10 in orientation parameter (R2). If the orientation parameter (R2) of the fibers is 3 to 10, a stencil sheet excellent in printing durability can be obtained.

The orientation parameter (R1) of the film and the orientation parameter (R2) of the fibers of the present invention mean the values obtained by laser Raman spectroscopy using "Ramanor" U-1000I produced by Jobin Yvon/Atago Bussan K.K. (with NEC GLG3300 $Ar^+$ laser 514.5 nm as the light source, and Olympus Model BH-2 objective×100 as the microscope).

The orientation parameter (R1) of the film is obtained by embedding a stencil sheet into PMMA resin, wet-grinding to form a section perpendicular to the transverse direction of the film, and irradiating the film with a laser beam in a direction perpendicular to the section. In this case, the peak intensities of 1615 $cm^{-1}$ band by the laser beam polarized in the face direction of the film and by the laser beam polarized in the thickness direction of the film are identified as Iyy and Ixx respectively, and their ratio Iyy/Ixx is obtained as R1.

The orientation parameter (R2) of the fibers is obtained by irradiating the fibers with a laser beam in a direction perpendicular to the fiber axis, using the above instrument. In this case, the peak intensities of 1615 $cm^{-1}$ of the Raman spectra by the laser beam polarized in a length direction of the fibers and by the laser beam polarized in a diameter direction of the fibers are identified as Iyy and Ixx, and their ratio Iyy/Ixx is obtained as R2.

In the measurement of both R1 and R2, one stencil sheet is measured at 20 or more places, and an average value is adopted. When the values of the orientation parameters R1 and R2 are larger, the respective degrees of orientation are higher.

The fibrous support forms a network with heat-bonded portions where fibers are heat-bonded to each other at their crossings. It can be either a woven fabric or nonwoven fabric, but is preferably a nonwoven fabric. One of the preferable features of the present invention is that, at the crossings, some of the heat-bonded portions of the fibrous support have web-like films which connect two or more fibers respectively. Since the fibrous support is a network which partially has the web-like films connecting the fibers, the stencil sheet obtained is excellent in printing durability. The web-like films in a fibrous support of a stencil sheet of the present invention are akin to webs formed in the feet of ducks or webs formed in the feet of frogs.

In the fibrous support of the present invention, it is preferable that the number of any such web-like films of the fibrous support which are more than 50 μm in diameter is 30 or less, more preferably 20 or less, still more preferably 10 or less, per 1 $mm^2$. If the number of the web-like films which are more than 50 μm in diameter is 30 or less per 1 $mm^2$, the ink permeates the support smoothly, to allow highly precise printing.

The size and number of the web-like films formed in the fibrous support can be observed by an electron microscope. Specifically, the stencil sheet is observed from the support side using an electron microscope at nine randomly selected regions of the stencil sheet, and a total of nine photos (9 cm×11.2 cm) of 100 times magnification are taken. Then, a circle with a diameter of 50 μm is drawn on a transparent sheet which overlaps each of the photos, to count the number of web-like films larger than the circle. In this way, the numbers in each of the nine photos are counted, to calculate the number per 1 $mm^2$ of the support area.

The polyester film is preferably 230° C. or lower, more preferably 220° C. or lower, still more preferably 210° C. or lower in melting point (Tm1). If the melting point is 230° C. or lower, the thermal perforability of the film is good.

The relation between the melting point (Tm1) of the polyester film and the melting point (Tm2) of the fibers is preferably Tm1<Tm2, and more preferably (Tm2−Tm1) is 5° C. or more in the difference, still more preferably 10° C. or more. If the relation is Tm1<Tm2, the support may not shrink by the heat of the thermal head during perforation.

The thickness of the polyester film is preferably 0.1 to 5 μm, more preferably 0.1 to 3 μm, still more preferably 0.1 to 2 μm. If the thickness is 5 μm or less, perforability does not decline, and if 0.1 μm or more, the stability during production is good.

The polyester film is preferably 10 to 50 J/g, more preferably 10 to 40 J/g in crystal melting energy (ΔHu). If ΔHu is 10 to 50 J/g, the film when in apertured form is stable to allow easy printing of clear characters.

The average diameter of the polyester fibers is preferably 0.5 to 20 μm, more preferably 1 to 15 μm, still more preferably 1 to 10 μm. If the average diameter is 0.5 μm or more, a sufficient strength as a support can be obtained, and if 20 μm or less, the flatness of the film is good. The polyester fibers constituting the fibrous support can be the fibers of the same diameter or a mixture of fibers different in diameter. The sectional form of the fibers is preferably circular or ellipsoidal, though not especially limited.

The fibrous support is preferably 1 to 20 $g/m^2$, more preferably 2 to 16 $g/m^2$, still more preferably 3 to 14 $g/m^2$ in weight. If the weight is 1 $g/m^2$ or more, ink retainability is good, and if 20 $g/m^2$ or less, ink permeability is good.

The polyester fibers are preferably 10% to 50%, more preferably 15% to 50%, still more preferably 20% to 50% in crystallinity. If the crystallinity is 10% or more, sufficient heat resistance as a support can be obtained.

The delamination strength of the stencil sheet between the film and the support is preferably 0.01 N/cm or more, more preferably 0.05 N/cm or more, still more preferably 0.1 N/cm or more. If the delamination strength is 0.01 N/cm or more, wrinkling or breakage is unlikely to occur while the film is being fed, and the stencil sheet is excellent in running stability.

The polyester used in the polyester film and polyester fibers is a polyester mainly composed of an aromatic dicarboxylic acid, aliphatic dicarboxylic acid or alicyclic dicarboxylic acid, and a diol. The aromatic dicarboxylic acid can be selected, for example, from terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid and 4,4'-diphenylsulfondicarboxylic acid. Among them, terephthalic acid, isophthalic acid and 2,6-naphthalenedicarboxylic acid are preferable. The aliphatic dicarboxylic acid can be selected, for example, from adipic acid, suberic acid, sebacic acid and dodecandionic acid. Among them, adipic acid is preferable. The alicyclic dicarboxylic acid can be, for example, 1,4-cyclohexanedicarboxylic acid. One or more of these acids can be used, and furthermore, a hydroxy acid such as hydroxybenzoic acid can also be partially copolymerized. The diol can be selected, for example, from ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol and 2,2'-bis(4'-β-hydroxyethoxyphenyl)propane. Among them, ethylene glycol is preferably used. One or more of these diols can be used.

The polyesters which are preferably used for the polyester film include polyethylene terephthalate, ethylene terephthalate-ethylene isophthalate copolymer, ethylene terephthalate-ethylene naphthalate copolymer, hexamethylene terephthalate-cyclohexanedimethylene terephthalate copolymer and polyethylene terephthalate-polybutylene terephthalate blend. Polyesters especially preferable having regard to perforation sensitivity and stretchability include ethylene terephthalate-ethylene isophthalate copolymer and ethylene terephthalate-ethylene naphthalate copolymer.

The polyesters which are preferably used for the polyester fibers include polyethylene terephthalate, polyethylene naphthalate, polybutylene terephthalate and ethylene terephthalate-ethylene isophthalate copolymer. Polyesters especially preferable having regard to thermal dimensional stability are polyethylene terephthalate and polyethylene naphthalate.

A process for producing the heat-sensitive stencil sheet is described below.

The polyester used in the present invention can be produced according to any of the following methods. For example, an acid and a diol are directly esterified, and the reaction product is heated under reduced pressure, for polycondensation while the excessive diol is removed. As another process, a dialkyl ester is used as an acid and subjected to an ester interchange reaction with a diol, and the reaction product is polycondensed as described above. In this case, as required, a conventional publicly known alkali metal, alkaline earth metal, manganese, cobalt, zinc, antimony, germanium or titanium compound can also be used as a reaction catalyst.

The polyester film can contain, as required, a flame retarder, thermal stabilizer, antioxidant, ultraviolet absorbent, antistatic agent, pigment, dye, fatty acid ester or organic lubricant such as wax or defoaming agent such as polysiloxane. Furthermore, as required, low sliding friction can be given. Although the method for giving sliding friction is not especially limited, for example, inorganic particles of clay, mica, titanium oxide, calcium carbonate, kaolin, talc or wet or dry silica, or organic particles of acrylic acid or styrene, can be added. As another method, the catalyst added during polyester polymerization process can be precipitated for forming internal particles. As a still further method, a surfactant can be applied.

The polyester fibers can contain, as required, a flame retarder, thermal stabilizer, antioxidant, ultraviolet absorbent, antistatic agent, pigment, dye, fatty acid ester, organic lubricant such as wax, or defoaming agent such as polysiloxane.

The polyester fibers can be chemically treated on the surfaces by using an acid or alkali, corona treatment or low temperature plasma treatment.

In the present invention, the method for bonding the polyester film and the fibrous support formed by polyester fibers is not especially limited. If, as in a preferred method, a cast polyester film and a fibrous support formed from undrawn polyester fibers are thermally heat-bonded and co-stretched, a preferred stencil sheet is obtained. In that way, the film and the fibers constituting the fibrous support can be stretched without being delaminated, and a stencil sheet sufficient in bonding strength can be obtained. Furthermore, since the fibers of the fibrous support act as a reinforcing material, the stability during production is good even when the thickness of the film is thin.

To thermally bond a cast polyester film and a fibrous support formed from undrawn polyester fibers, it is preferable to heat and pressurize the overlapped film and support, and the method of thermal bonding is not especially limited. However, thermal bonding by hot rolls is especially preferable. The hot rolls to be used are preferably metallic rolls, teflon rolls or silicone rolls. The thermal bonding temperature is preferably near the glass transition point (Tg) of the film, especially preferably in a range of Tg−10° C. to Tg+30° C. The linear pressure of the roll for thermal bonding is preferably in a range of 0.1 to 100 N/cm.

The method for co-stretching the thermally bonded film and support is not especially limited. Either uniaxial stretching or biaxial stretching can be used, but biaxial stretching is preferable. Biaxial stretching can be sequential biaxial stretching or simultaneous biaxial stretching, but sequential biaxial stretching is especially preferable. In the case of sequential biaxial stretching, usually longitudinal stretching by a group of hot rolls is generally followed by transverse stretching by a tenter type stretching machine, but the order can be reversed. The material of the hot rolls is preferably teflon, ceramic or silicone rubber. The material of nip rolls is especially preferably silicone rubber. The nip pressure during stretching is in a range of 0.1 to 100 N/cm in roll linear pressure. The stretching temperature is preferably 50° C. to 150° C., more preferably 60° C. to 130° C. For uniform heating during stretching, the support alone can be preheated before being supplied to the stretching rolls. Furthermore, for uniform stretching of the film and support, the thermally bonded film and support can be heated, for example, by an infrared heater, immediately before stretching.

The stretching ratio is not especially limited, but an appropriate ratio is preferably 2 to 8 times, more preferably 3 to 8 times longitudinally and transversely respectively. Moreover, biaxial stretching can be followed by longitudinal and/or transverse re-stretching.

The cast polyester film is produced, for example, by extruding a polymer onto a cooling drum by T-die extrusion, and fed to be co-stretched.

The intrinsic viscosity of the polyester used for the film is preferably 0.5 or more, more preferably 0.6 or more, still more preferably 0.65 or more. If the intrinsic viscosity is 0.5 or more, formation is stable, and an especially thin film can be easily cast.

The fibrous support formed by undrawn polyester fibers can be preferably produced as a nonwoven fabric by a direct melt spinning method such as a melt blow method or spun bond method.

For example, in the melt blow spinning method, when a molten polymer is discharged from a die, hot air is blown from around the spinning holes, to divide the discharged polymer into fine fibers, and the fibers are collected on a net conveyor installed at a proper position, for forming a nonwoven fabric web. Since the web is sucked together with hot air by a suction device provided in the net conveyor, the fibers are collected before they are perfectly solidified. That is, they are collected in a state where they are heat-bonded to each other. The heat bonding degree between the respective fibers can be adjusted by properly setting the collection distance between the nozzle plate and the net conveyor. The melt blown fibers are formed into finer fibers by the pressure of hot air, and solidified in a non-oriented or very little oriented, i.e., undrawn state. The polymer discharged from the nozzle plate is solidified in an amorphous or almost amorphous state since it is quickly cooled in a room temperature atmosphere from a molten state.

In the spun bond method, the filaments discharged from a nozzle plate are driven at high speed by an air ejector, and the partially or wholly oriented filaments obtained are scattered, optionally impinged against a plate to be opened (separated individually) and collected to form a web on a conveyor. The weight of the web can be controlled by properly setting the amount of the polymer discharged and the conveyor speed. The thickness of fibers and the molecular orientation state can be adjusted by properly adjusting the pressure, flow rate, etc. of the ejector. If the pressure and flow rate are lowered to retard the spinning speed, an almost undrawn fiber web low in molecular orientation degree can be obtained. Furthermore, by adjusting the cooling speed of the discharged polymer, a fiber web low in crystallinity can be obtained.

The intrinsic viscosity of the polymer used for the polyester fibers is preferably 0.35 or more, more preferably 0.4 or more, still more preferably 0.45 or more. If the intrinsic viscosity is 0.35 or more, fibers with a sufficient strength can be obtained.

The orientation parameter (R1) of the film and the orientation parameter (R2) of the fibers, and the size and number of the web-like films formed in the fibrous support can be made to conform to the values required in accordance with the present invention, by properly selecting the polymer used for the cast film, its polymerization degree, the polymer used for the fibers, its polymerization degree, spinning conditions, the conditions for thermally bonding the cast polyester film and the fibrous support formed by undrawn polyester fibers, the temperatures of both film and fibrous support during co-stretching, stretching ratios, the pressure for compressing between rolls, heat treatment temperature, etc.

In this case, it is preferable that the cast polyester film and the fibrous support formed from undrawn polyester fibers are similar in stretching behaviour. The cast polyester film and the undrawn polyester fibers are preferably 10% or less, more preferably 7% or less, still more preferably 5% or less in crystallinity. Furthermore, the undrawn polyester films and the undrawn polyester fibers are preferably 1 to 1.5, more preferably 1 to 1.3, still more preferably 1 to 1.2 in orientation parameters (R1 and R2). The stretching behaviour means, for example, changing drawing tensions depending on, for example, temperature, drawing speed and drawing ratio.

It is preferable that the stretching behaviours of both of the film and the fibers are similar. For example, by adjusting the temperatures of the bonding rolls of both of the film and fibers separately, the stretching tension can be controlled separately. In most cases, the temperature of the bonding rolls of the fiber is set higher than that of the film. The difference of the temperatures is, preferably, 3° C. or more, more preferably, 5° C. or more. However, it greatly depends upon the thermal behaviours of the polymer, such as glass transition temperatures or melting temperatures of both of the film and fibers. Even when the cast polyester film and the fibrous support formed from undrawn polyester fibers are greatly different in stretching behaviour, both the film and fibers can be highly oriented and the size and number of web-like films can be adjusted by preheating the cast polyester film and the fibrous support formed by undrawn polyester fibers by using different infrared heaters before longitudinal stretching, or by bringing the cast polyester film and the fibrous support formed from undrawn polyester fibers into direct contact with bonding rolls different in temperature, or by using infrared heating and roll heating in combination before stretching. Furthermore, in the preheating zone before transverse stretching by a tenter type stretching machine, the stencil sheet can be preheated by hot air different in temperature between the film and the fiber, and if the preheated stencil sheet is transversely stretched in the stretching zone, both the film and fibers can be highly oriented.

Anyway, to manage R1 and R2 in a predetermined range, it does not need too many tests to determine the temperature conditions of the bonding and the co-stretching, since changing the temperatures and measuring R1 and R2 of the products are easy and obvious procedures in the art to carry out.

Furthermore, it is preferable to heat-treat the biaxially stretched stencil sheet. The heat treatment temperature is not especially limited, but is preferably between the glass transition temperature (Tg) and the melting point (Tm), more preferably Tg+1° C. to Tm−10° C. The proper treatment time is usually about 0.5 to 60 seconds.

The stencil sheet obtained by heat treatment can also be once cooled to about room temperature, and aged in a relatively low temperature range from 40 to 90° C. for 5 minutes to about one week. The aging is especially preferable since the stencil sheet is less curled and wrinkled during storage and in a printer.

It is preferable to coat the stencil sheet on the film with a releasing agent for preventing the heat bonding to the thermal head, etc. Preferable releasing agents include, for example, silicone oil, silicone based resins, fluorine based resins and surfactants. These releasing agents can also contain various additives such as antistatic agent, heat resisting material, antioxidant, organic particles, inorganic particles and pigment, as far as the desired effects of the present invention are not impaired.

The thickness of the releasing agent layer is preferably 0.005 μm to 0.4 μm, more preferably 0.01 μm to 0.2 μm. If the thickness of the releasing agent layer is 0.005 μm or more, the runnability of the stencil sheet is good, and if the thickness is 0.4 μm or less, the thermal head is not stained. The releasing agent can be applied before or after the stretching of the film. The coating method is not limited, but, for example, a roller coater, gravure coater, reverse coater, bar coater can be properly used.

Furthermore, before application of the releasing agent, the coating surface of the film can also be treated by corona discharge in air or any of other various atmospheres.

The methods for measuring and evaluating the properties are described below.

(1) Orientation parameter (R1) of film

The orientation parameter (R1) was measured using a "Ramanor" U-1000I produced by Jobin Yvon/Atago Bussan K.K. (with NEC GLG3300 $Ar^+$ laser 514.5 nm as the light source, and Olympus Model BH-2 objective×100 as the microscope).

A stencil sheet was embedded in PMMA resin, and wet-ground to form a section perpendicular to the transverse direction of the film, and the film was irradiated with a laser beam in the direction perpendicular to the section. The peak intensities of 1615 $cm^{-1}$ band by the laser beam polarized in the face direction of the film and by the laser beam polarized in the thickness direction of the film were identified as Iyy and Ixx respectively, and the ratio Iyy/Ixx was obtained as R1. The measurement was executed at 20 or more places per stencil sheet, and the average value was adopted.

(2) Orientation parameter (R2) of fibers

A stencil sheet was irradiated on the support side, with a laser beam in the direction perpendicular to the fiber axis, using the above instrument. The peak intensities of 1615 $cm^{-1}$ of the Raman spectra by the laser beam polarized in the length direction of the fibers and by the laser beam polarized in the diameter direction of the fibers were identified as Iyy and Ixx, and their ratio Iyy/Ixx was obtained as R2. The measurement was effected at 20 or more places per stencil sheet, and average value was adopted.

(3) Size and number of web-like films

A stencil sheet of 10 cm×10 cm was prepared, and observed on the support side using an electron microscope at nine randomly selected places of the stencil sheet, and a total of nine photos (9 cm×11.2 cm, corresponding to an actual area of 1 $mm^2$) 100 times in magnification. Then, a circle with a diameter of 5 mm (corresponding to an actual diameter of 50 μm) was drawn on a transparent sheet which overlapped each of the photos, to count the number of web-like films larger than the circle. In this way, the numbers on each of the nine photos were counted, to calculate the number per 1 $mm^2$ of the support area.

(4) Melting point of film (Tm1° C.)

From a stencil sheet, the film was separated and fibers were removed from the film surface carefully, to obtain 5 mg of a sample. The sample was heated from room temperature at a heating rate of 20° C./min using a differential scanning calorimeter, Model RDC220 produced by Seiko Denshi Kogyo K.K., and the melting point was obtained from the peak temperature of the heat absorption curve.

(5) Melting point of fibers (Tm2° C.)

From a stencil sheet, the film was removed, and 5 mg of a sample was taken from the fibers. The sample was heated from room temperature at a heating rate of 20° C./min using a differential scanning calorimeter, Model RDC220 produced by Seiko Denshi Kogyo K.K., and the melting point was obtained from the peak temperature of the heat absorption curve.

(6) Crystal melting energy of film (ΔHu J/g)

From a stencil sheet, the film was separated, and from the film surface, fibers were carefully removed. The crystal melting energy was obtained from the following area in the heat absorption curve, using a differential scanning calorimeter, Model RDC220 produced by Seiko Denshi Kogyo K.K. The area refers to an area formed by the curve rising from the base line toward the absorption side due to heating and returning to the base line due to further continued heating. The position of melt start temperature and the position of end temperature are determined by extrapolation of the lines, and the area surrounded by the above curve and the base line is area (a). Under the same DSC conditions, the corresponding area (b) of indium was measured, and with the crystal melting energy for the area (b) as 28.5 J/g, the crystal melting energy of the sample was obtained from the following formula:

$$\Delta Hu = 28.5 \times a/b \ (J/g)$$

(7) Average diameter of fibers (μm)

Ten randomly selected regions of a sample were photographed at a magnification of 2000 times using an electron microscope, and for each photo, the diameters of 15 fibers were measured. Thus, diameters of 150 fibers in total were obtained, and the average value was used.

(8) Weight of fibrous support ($g/m^2$)

A stencil sheet of 20 cm×20 cm was cut out, and its weight was measured. The weight of the film was subtracted from it, and the weight per $m^2$ was calculated. The weight of the film was obtained by calculation based on the density and thickness. The density of the film was assumed to be 1.38 $g/cm^3$, and the thickness of the film was measured by observing a section of the stencil sheet by an electron microscope.

(9) Crystallinity (%)

A sample was placed into a density gradient tube containing a mixture of n-heptane and carbon tetrachloride, and 10 hours later, the value was read as the density. With the density at a crystallinity of 0% as 1.335 $g/cm^3$ and with the crystallinity at a density of 100% as 1,455 $g/cm^3$, the crystallinity of the sample was calculated.

(10) Evaluation of perforability

A stencil sheet was supplied into a printer, "RISOGRAPH (GR275) produced by Riso Kagaku Kogyo K.K., and an original (B4 size) in which a black solid square (■) of 10 mm per side, characters of 3 pt. to 16 pt. and rules different in thickness were written was used to perforate a stencil sheet. The black solid portion of the stencil sheet was sampled, and the film side was photographed using an electron microscope at a magnification of 100 times. The number of non-perforated dots was counted among 150 dots contacted by the thermal head, and the perforability was evaluated according to the following criterion:

| | |
|---|---|
| 0 in the number of non-perforated dots | ⊚ |
| 1 to less than 5 in the number of non-perforated dots | ○ |
| 5 to less than 10 in the number of non-perforated dots | Δ |
| 10 or more in the number of non-perforated dots | × |

(11) Evaluation of printability

The stencil sheet perforated as above was used to print by a printer, "RISOGRAPH"(GP275) produced by Riso Kagaku Kogyo K.K. under ordinary conditions, and on the 20th print, the densities of the black solid portion at 10 places were measured by a Macbeth optical densitometer. The printability was evaluated according to the following criterion:

| | |
|---|---|
| 1.2 or more in density | ⊚ |
| 0.9 to less than 1.2 in density | ○ |
| 0.7 to less than 0.9 in density | Δ |
| Less than 0.7 in density | × |

(12) Evaluation of printing durability

The stencil sheet perforated as above was used to print 3000 sheets at a printing speed of 100 sheets/min. The printing durability was evaluated according to the following criterion:

| | |
|---|---|
| 3000 sheets could be printed without any trouble. | ⊚ |
| Rules became slightly thicker. | ○ |
| Rules became distorted and thicker. | Δ |
| The stencil sheet became wrinkled or broken. | × |

EXAMPLE 1

A rectangular nozzle plate with 100 holes of 0.3 mm in diameter was used to spin polyethylene terephthalate ([η]=0.485, Tm2=254° C.) by the melt blow method at a nozzle plate temperature of 285° C., at a hot air temperature of 290° C. and at a hot air flow rate of 400 $Nm^3/h$, and the fibers were collected and taken up on a conveyor with the collection distance set at 17 cm, to produce a undrawn fiber web of 120 $g/m^2$ in weight. The undrawn fibers were 2% in crystallinity and 0.002 in birefringence (Δn).

Separately, a copolymerized polyester resin ([η]=0.75, Tm1=192° C.) consisting of 75 mol % of ethylene terephthalate and 25 mol % of ethylene isophthalate was extruded by an extruder of 40 mm in screw diameter at a T die temperature of 275° C., and cast onto a cooling drum of 300 mm in diameter, to prepare a cast film.

The cast film and the undrawn fiber web were made to overlap and supplied into a longitudinal stretching machine, in which they were passed over, then under alternate bonding rolls (made of teflon), arranged in series with one another and downstream of the inlet, to be thermally bonded, and so form a laminate. Four such rolls are provided in the series, so that the cast film contacts respective upper regions of the first and third rolls, and the film web contacts respective lower regions of the second and fourth rolls, in the series. Successive rolls, in the direction of travel of the laminate, are at respective temperatures of 80° C., 100° C., 80° C. and 100° C. With this arrangement, the rolls at the higher temperature (100° C.) were kept in contact with the nonwoven fabric, while the rolls at the lower temperature (80° C.) were kept in contact with the film. Then, the thermally bonded laminate was stretched to 3.5 times in the longitudinal direction by stretching rolls (made of silicone rubber) of 95° C. in temperature, and cooled to room temperature. The nip linear pressure of the stretching rolls was set at 0.1 kg/cm.

Then, the laminate was fed into a tenter type stretching machine, stretched to 4.0 times in the transverse direction at a preheating temperature of 90° C. at a stretching temperature of 95° C., furthermore heat-treated in the tenter at 120° C., and taken up as a roll. The laminate was coated on the film side with a silicone based releasing agent, to obtain a heat-sensitive stencil sheet. The stencil sheet obtained was 1.2 μm in film thickness, 10 g/m$^2$ in the weight of the support fibers, and 5 μm in average fiber diameter. The orientation parameter (R1) of the film of the stencil sheet was 6.5, and the orientation parameter (R2) of the support fibers was 6.0.

The stencil sheet was ⊚ in both printability and runnability. The runnability means that the stencil sheet passes through the printer with no trouble, for example, without being wrinkled.

Comparative example 1

A heat-sensitive stencil sheet was obtained as described in Example 1, except that the temperatures of all the bonding rolls were set at 80° C. The orientation parameter (R1) of the film of the stencil sheet was 4.0, and the orientation parameter (R2) of the support fibers was 2.8. The support fibers were observed, and found to be loose and fluffy. The stencil sheet was ○ in printability, but × in runnability.

Comparative example 2

A heat-sensitive stencil sheet was obtained as described in Example 1, except that the temperatures of all the bonding rolls were set at 100° C. The orientation parameter (R1) of the film of the stencil sheet was 2.9, and the orientation parameter (R2) of the support fibers was 4.5.

The stencil sheet was × in printability, but ○ in runnability.

EXAMPLE 2

A rectangular nozzle plate with 100 holes of 0.3 mm in diameter was used to spin polyethylene terephthalate ([η]=0.55, Tm2=255° C.) by the melt blow method at a nozzle plate temperature of 290° C., at a hot air temperature of 295° C. and at a hot air flow rate of 500 Nm$^3$/h, and the fibers were collected and taken up on a conveyor with the collection distance set at 17 cm, to produce a undrawn fiber web of 120 g/m$^3$ in weight. The undrawn fibers were 1.5% in crystallinity and 0.001 in birefringence (Δn).

Separately, a copolymerized polyester resin ([η]=0.72, Tm1=198° C.) consisting of 80 mol % of ethylene terephthalate and 20 mol % of ethylene isophthalate was processed as described in Example 1, to produce a cast film.

The cast film and the undrawn fiber web were made to overlap and supplied into a longitudinal stretching machine, in which they were passed over then under alternate bonding rolls arranged in a series of four as in Example 1, to be thermally bonded to form a laminate. The respective temperatures of successive bonding rolls (again made of teflon) were set at 80° C., 90° C., 80° C. and 90° C. as in Example 1 with the rolls at 90° C. kept in contact with the non-woven fabric and the rolls at 80° C. kept in contact with the film. Then, the thermally bonded laminate was stretched in the longitudinal direction to 3.5 times by stretching rolls (made of silicone rubber) of 95° C. in temperature, and cooled to room temperature. The nip linear pressure of the stretching rolls was set at 0.1 kg/cm. Immediately before the stretching rolls, the laminate was heated on the nonwoven fabric side at a power of 1 kW by an infrared heater.

Then, the laminate was fed into a tenter type transverse stretching machine, and stretched to 4.0 times in the transverse direction at a preheating temperature of 90° C. and at a stretching temperature of 95° C., furthermore heat-treated at 120° C. in the tenter, and taken up as a roll. The laminate was coated on the film side with a silicone based releasing agent, to obtain a heat-sensitive stencil sheet. The stencil sheet obtained was 1.2 μm in film thickness, 11 g/m$^2$ in the weight of the support fibers, and 4 μm in average fiber diameter. The orientation parameter (R1) of the film of the stencil sheet was 6.0, and the orientation parameter (R2) of the support fibers was 5.8.

The stencil sheet was ⊚ in both printability and runnability.

Comparative example 3

A heat-sensitive stencil sheet was obtained as described in Example 2, except that the heating by the infrared heater immediately before the stretching rolls was not executed.

The orientation parameter (R1) of the film of the stencil sheet was 4.0, and the orientation parameter (R2) of the support fibers was 2.9.

The stencil sheet was ○ in printability, but × in runnability.

EXAMPLE 3

A rectangular nozzle plate with 100 holes of 0.3 mm in diameter was used to spin polyethylene terephthalate ([η]=0.615, Tm2=254° C.) by the melt blow method at a nozzle plate temperature of 295° C., at a hot air temperature of 300° C. and at a hot air flow rate of 450 Nm$^3$/h, and the fibers were collected and taken up on a conveyor with the collection distance set at 15 cm, to produce a undrawn fiber web of 120 g/m$^2$ in weight.

Separately, a copolymerized polyester resin ([η]=0.72, Tm1=190° C.) consisting of 70 mol % of ethylene terephthalate and 30 mol % of 2,6-naphthalenedicarboxylic acid was used to produce a cast film as described in Example 1.

The cast film and the undrawn fiber web were made to overlap and supplied into a longitudinal stretching machine, in which they were passed over, then under alternate bonding rolls arranged in a series of four as in Example 1, to be thermally bonded to form a laminate. The respective temperatures of successive bonding rolls (again made of teflon) were 90° C., 100° C., 90° C. and 100° C. with the rolls at 100° C. kept in contact with the nonwoven fabric and the rolls at 90° C. kept in contact with the film. The thermally bonded laminate was stretched to 3.5 times in the longitudinal direction by stretching rolls of 100° C. in temperature, and cooled to room temperature. The nip linear pressure of the stretching rolls was set at 0.1 kg/cm. Immediately before the stretching rolls, the laminate was heated on the nonwoven fabric side at a power of 1 kW by an infrared heater.

Then, the laminate was fed into a tenter type transverse stretching machine, preheated with the bonding temperature on the film side set at 95° C. and with the bonding temperature on the nonwoven fabric side set at 110° C., stretched to 4.0 times in the transverse direction at a stretching temperature of 100° C., furthermore heat-treated at 130°

C. in the tenter, and taken up as a roll. The laminate was coated on the film side with a silicone based releasing agent, to obtain a heat-sensitive stencil sheet. The stencil sheet obtained was 1.2 μm in film thickness, 9 $g/m^2$ in the weight of the support fibers, and 4.5 μm in average fiber diameter.

The orientation parameter (R1) of the film of the stencil sheet was 6.4, and the orientation parameter (R2) of the support fibers was 6.3.

The stencil sheet was ○ in both printability and runnability.

Comparative example 4

A heat-sensitive stencil sheet was obtained as described in Example 3. except that the bonding temperatures on both the film and nonwoven fabric sides were set at 95° C. The orientation parameter (R1) of the film of the stencil sheet was 4.3, and the orientation parameter (R2) of the support fibers was 2.9.

The stencil sheet was ○ in printability, but × in runnability.

Comparative example 5

A nozzle plate with 100 holes of 0.25 mm in diameter was used to spin polyethylene terephthalate ([η]=0.65, Tm=254° C.) at a melt temperature of 290° C., and the fibers were dispersed by an air ejector at a spinning speed 4500 m/min, being collected on a conveyor, and embossed at a temperature of 200° C., to produce a drawn nonwoven fabric of 20 $g/m^2$ in weight.

Separately, the same copolymerized polyester resin of isophthalic acid as used in Example 1 was used to produce a 1.2 μm thick biaxially stretched film.

The biaxially stretched film and the drawn nonwoven fabric were made to overlap, thermally bonded by metallic calender rolls at a temperature of 160° C., and coated on the film side with a silicone based releasing agent, to produce a heat-sensitive stencil sheet. The orientation parameter (R1) of the film of the stencil sheet was 2.8, and the orientation parameter (R2) of the support fibers was 4.6.

The stencil sheet was × in printability, but ○ in runnability.

EXAMPLE 4

A rectangular nozzle plate with 100 holes of 0.3 mm in diameter was used to spin polyethylene terephthalate ([η]=0.485, Tm2=254° C.) by the melt blow method at a nozzle plate temperature of 290° C., at a hot air temperature of 295° C. and at a hot air flow rate of 430 $Nm^3/h$, and the fibers were collected and taken up on a conveyor with the collection distance set at 18 cm, to produce a undrawn fiber web of 130 $g/m^2$. The undrawn fibers were 2.5% in crystallinity and 1.0 in orientation parameter (R2).

Separately, a copolymerized polyester resin ([η]=0.74, Tm1=191° C.) consisting of 75 mol % of ethylene terephthalate and 25 mol % of ethylene isophthalate was extruded using an extruder of 40 mm in screw diameter at a T die temperature of 275° C., and cast onto a cooling drum of 300 mm in diameter (50° C. in drum temperature), to produce a cast film.

The cast film and the undrawn fiber web were made to overlap and supplied into a longitudinal stretching machine, in which they were passed over, then under alternate bonding rolls, arranged in a series of four as in Example 1, to be thermally bonded to form a laminate. The respective temperatures of successive bonding rolls were 80° C., 95° C., 80° C. and 95° C. with the rolls at 95° C. kept in contact with the nonwoven fabric and the rolls at 80° C. kept in contact with the film. The thermally bonded laminate was stretched to 3.5 times in the longitudinal direction by stretching rolls (made of silicone rubber) of 95° C. in temperature, and cooled to room temperature. The nip linear pressure of the stretching rolls was set at 1 kg/cm.

Then, the laminate was fed into a tenter type transverse stretching machine, stretched to 4.0 times in the transverse direction at a preheating temperature of 90° C. and at a stretching temperature of 95° C., furthermore heat-treated at 110° C. in the tenter, and taken up as a roll. The laminate was coated on the film side with a silicone based releasing agent, to obtain a heat-sensitive stencil sheet. The stencil sheet obtained was 1.3 μm in film thickness, 10 $g/m^2$ in the weight of the support, and 4.6 μm in average fiber diameter. The orientation parameter (R1) of the film of the stencil sheet was 6.4, and the orientation parameter (R2) of the support fibers was 6.2. Furthermore, the support surface of the stencil sheet was photographed using an electron microscope, and the number of web-like films exceeding 50 μm in diameter was counted and found to be 5 per 1 $mm^2$. The stencil sheet was ◎ in all of perforability, printability and printing durability.

EXAMPLE 5

A heat-sensitive stencil sheet was produced as described in Example 4, except that the nip linear pressure of the stretching rolls was set at 3 kg/cm. The orientation parameter (R1) of the film of the stencil sheet was 6.3, and the orientation parameter (R2) of the support fibers was 6.0. Furthermore, the support surface of the stencil sheet was photographed using an electron microscope, and the number of web-like films exceeding 50 μm in diameter was counted and found to be 13 per 1 $mm^2$. The stencil sheet was ◎ in perforability, ○ in printability and ◎ in printing durability.

EXAMPLE 6

A heat-sensitive stencil sheet was produced as described in Example 4, except that the nip linear pressure of the stretching rolls was set at 5 kg/cm. The orientation parameter (R1) of the film of the stencil sheet was 6.3, and the orientation parameter (R2) of the support fibers was 6.1. Furthermore, the support surface of the stencil sheet was photographed, and the number of web-like films exceeding 50 μm in diameter was counted and found to be 25 per 1 $mm^2$. The stencil sheet was ◎ in perforability, ○ in printability and ◎ in printing durability.

EXAMPLE 7

A heat-sensitive stencil sheet was produced as described in Example 4, except that the nip linear pressure of the stretching rolls was set at 7 kg/cm. The orientation parameter (R1) of the film of the stencil sheet was 6.0, and the orientation parameter (R2) of the support fibers was 5.8. Furthermore, the support surface of the stencil sheet was photographed using an electron microscope, and the number of web-like films exceeding 50 μm in diameter was counted and found to be 30 per 1 $mm^2$. The stencil sheet was ◎ in perforability, Δ in printability and ○ in printing durability.

EXAMPLE 8

A heat-sensitive stencil sheet was produced as described in Example 4, except that the nip linear pressure of the stretching rolls was set at 10 kg/cm. The orientation parameter (R1) of the film of the stencil sheet was 5.4, and the orientation parameter (Rw) of the support fibers was 5.1. The support surface of the stencil sheet was photographed using an electron microscope, and the number of web-like films exceeding 50 μm in diameter was counted and found to be 35 per 1 $mm^2$. The stencil sheet was ○ in perforability, Δ in printability and ○ in printing durability.

Comparative example 6

A rectangular nozzle plate with 100 holes of 0.35 mm in diameter was used to spin polyethylene terephthalate ([η]=0.6, Tm2=257° C.) by the melt blow method at a nozzle plate temperature of 280° C. and at a discharge rate of 30 g/min, and the fibers were collected and taken up on a conveyor with the collection distance set at 15 cm, to produce an undrawn fiber web of 80 g/$m^2$ in weight. The nonwoven fabric was 14.1 μm in average fiber diameter, 5% in crystallinity and 1.0 in orientation parameter (R2).

Separately, a copolymerized polyester ([η]=0.7, Tm1=228° C.) consisting of 86 mol % of polyethylene terephthalate and 14 mol % of ethylene isophthalate was extruded using an extruder of 40 mm in screw diameter at a T die temperature of 280° C., and cast onto a cooling drum of 300 mm in diameter, to produce a cast film.

The cast film and the nonwoven fabric formed by the undrawn polyester fibers were made to overlap and supplied to heating rolls, to be thermally pressure-bonded at a roll temperature of 80° C. The laminate thus obtained was passed over, then under alternate bonding rolls, arranged in a series of four to be thermally bonded. The temperatures of all the bonding rolls (made of a metal) were set at 90° C. Then, the laminate was stretched to 3 times in the longitudinal direction by stretching rolls (made of a metal) of 90° C. in temperature. The nip linear pressure of the stretching rolls was set at 5 kg/cm.

Then, the laminate was fed into a tenter type transverse stretching machine, and stretched to 3.5 times in the transverse direction at a stretching temperature of 95° C., and furthermore heat-treated in the tenter at 160° C. for 5 seconds, to produce a 30 μm thick heat-sensitive stencil sheet. The stencil sheet was coated with a wax based releasing agent at the inlet to the tenter using a gravure coater in an amount of 0.1 g/$m^2$ in dry weight. The stencil sheet obtained was 5.5 g/$m^2$ in the weight of the support, 8.2 μm in average fiber diameter, 2 μm in film thickness, and 7.7 cal/g in crystal melting energy. The orientation parameter (R1) of the film was 2.3, and the orientation parameter (R2) of the support fibers was 2.9. Furthermore, the support surface of the stencil sheet was photographed using an electron microscope, and the number of web-like films exceeding 50 μm in diameter was counted and found to be 50 per 1 $mm^2$. The stencil sheet was × in all of perforability, printability and printing durability.

Comparative example 7

A heat-resistant stencil sheet was obtained as described in Example 4, except that the temperatures of all the bonding rolls were set at 80° C. The support surface of the stencil sheet was photographed using an electron microscope, and the number of web-like films exceeding 50 μm in diameter was counted and found to be 13 per 1 $mm^2$. The orientation parameter (R1) of the film of the stencil sheet was 4.2, and the orientation parameter (R2) of the support fibers was 2.9. The stencil sheet was ○ in perforability and printability, but × in printing durability.

EXAMPLE 9

A rectangular nozzle plate with 100 holes of 0.3 mm in diameter was used to spin polyethylene terephthalate ([η]=0.55, Tm2=255° C.) by the melt blow method at a nozzle plate temperature of 295° C., at a hot air temperature of 295° C. and at a hot air flow rate of 500 $Nm^3$/h, and the fibers were collected and taken up on a conveyor with the collection distance set at 18 cm, to produce a undrawn fiber web of 130 g/$m^2$ in weight. The undrawn fibers were 1.5% in crystallinity and 1.01 in orientation parameter (R2).

Separately, a copolymerized polyester resin ([η]=0.72, Tm1=198° C.) consisting of 80 mol % of ethylene terephthalate and 20 mol % of ethylene isophthalate was used to produce a cast film as described in Example 4.

The cast film and the undrawn fiber web were made to overlap and supplied into a longitudinal stretching machine, in which they were passed over, then under alternate bonding rolls, arranged in a series of four as in Example 1, to be thermally bonded to form a laminate. The respective temperatures of successive bonding rolls (again made of teflon) were 85° C., 95° C., 85° C. and 95° C. with the rolls at 95° C. kept in contact with the nonwoven fabric and the rolls at 85° C. kept in contact with the film. Then, the thermally bonded laminate was stretched to 3.5 times in the longitudinal direction by stretching rolls (made of silicone rubber), and cooled to room temperature. The nip linear pressure of the stretching rolls was set at 1 kg/cm. Immediately before the stretching rolls, the laminate was heated on the nonwoven fabric side at a power of 1 kW by an infrared heater.

Then, the laminate was fed into a tenter type transverse stretching machine, and stretched to 4.0 times in the transverse direction at a preheating temperature of 95° C. and at a stretching temperature of 100° C., furthermore heat-treated at 120° C. in the tenter, and taken up as a roll. The laminate was coated on the film side with a silicone based releasing agent, to obtain a heat-sensitive stencil sheet. The stencil sheet obtained was 1.3 μm in film thickness, 11 g/$m^2$ in the weight of the support and 5 μm in average fiber diameter. The orientation parameter (R1) of the film of the stencil sheet was 6.3, and the orientation parameter (R2) of the support fibers was 6.0. Furthermore, the support surface of the stencil sheet was photographed using an electron microscope, and the number of web-like films exceeding 50 μm in diameter was counted and found to be 3 per 1 $mm^2$. The stencil sheet was ◎ in all of perforability, printability and printing durability.

EXAMPLE 10

A heat-sensitive stencil sheet was obtained as described in Example 9, except that the heating by the infrared heater immediately before the stretching rolls was effected at 1.5 kW.

The orientation parameter (R1) of the film of the stencil sheet was 5.7, and the orientation parameter (R2) of the support fibers was 5.5. Furthermore, the support surface of the stencil sheet was photographed using an electron microscope, and the number of web-like films exceeding 50 μm in diameter was counted and found to be 17 per 1 $mm^2$. The stencil sheet was ◎ in perforability, ○ in printability and ◎ in printing durability.

EXAMPLE 11

A heat-sensitive stencil sheet was obtained as described in Example 9, except that the heating by the infrared heater immediately before the stretching rolls was effected at 2.0 kW.

The orientation parameter (R1) of the film of the stencil sheet was 5.7, and the orientation parameter (R2) of the support fibers was 5.5. Furthermore, the support surface of the stencil sheet was photographed using an electron microscope, and the number of web-like films exceeding 50 μm in diameter was counted and found to be 27 per 1 $mm^2$. The stencil sheet was ◎ in perforability, ○ in printability and ◎ in printing durability.

EXAMPLE 12

A heat-sensitive stencil sheet was obtained as described in Example 9, except that the heating by the infrared heater immediately before the stretching rolls was effected at 3 kW.

The orientation parameter (R1) of the film of the stencil sheet was 5.1, and the orientation parameter (R2) of the support fibers was 4.9. Furthermore, the support surface of the stencil sheet was photographed using an electron microscope, and the number of web-like films exceeding 50 $\mu$m in diameter was counted and found to be 36 per 1 $mm^2$. The stencil sheet was ○ in perforability, Δ in printability and ○ in printing durability.

Comparative example 8

A heat-sensitive stencil sheet was obtained as described in Example 9, except that the heating by the infrared heater immediately before the stretching rolls was not effected. The support surface of the stencil sheet was photographed using an electron microscope, and the number of web-like films exceeding 50 $\mu$m in diameter was counted and found to be 13 per 1 $mm^2$. The orientation parameter (R1) of the film of the stencil sheet was 4.3, and the orientation parameter (R2) of the support fibers was 2.9. The stencil sheet was ○ in both perforability and printability, but × in printing durability.

EXAMPLE 13

A rectangular nozzle plate with 100 holes of 0.3 mm in diameter was used to spin polyethylene terephthalate ([η]=0.615, Tm2=254° C.) by the melt blow method at a nozzle plate temperature of 295° C., at a hot air temperature of 300° C. and at a hot air flow rate of 470 $Nm^3$/h, and the fibers were collected and taken up on a conveyor with the collection distance set at 16 cm, to produce an undrawn fiber web of 120 g/$m^2$ in weight. The undrawn polyester fibers were 1.0% in crystallinity and 1.03 in orientation parameter (R2).

Separately, a copolymerized polyester resin ([η]=0.72, Tm1=190° C.) consisting of 70 mol % of ethylene terephthalate and 30 mol % of 2,6-naphthalenedicarboxylic acid was used to produce a cast film as described in Example 4.

The cast film and the nonwoven fabric were made to overlap and supplied into a longitudinal stretching machine, in which they were passed under, then over alternate bonding rolls, arranged in a series of four as in Example 1, to be thermally bonded to form a laminate. The respective temperatures of successive bonding rolls (again made of teflon) were 90° C., 100° C., 90° C. and 100° C. with the rolls at 100° C. kept in contact with the nonwoven fabric and the rolls at 90° C. kept in contact with the film. Then, the thermally bonded laminate was stretched to 3.5 times in the longitudinal direction by stretching rolls (made of silicone rubber) of 100° C. in temperature, and cooled to room temperature. The nip linear pressure of the stretching rolls was set at 1 kg/cm. Immediately before the stretching rolls, the laminate was heated on the nonwoven fabric side at a power of 1.5 kW by an infrared heater.

Then, the laminate was fed into a tenter type transverse stretching machine, preheated with the preheating temperature on the film side set at 93° C. and the preheating temperature on the nonwoven fabric side set at 105° C., stretched to 4.0 times in the transverse direction at a stretching temperature of 110° C., furthermore heat-treated at 135° C. in the tenter, and taken up as a roll. The laminate was coated on the film side with a silicone based releasing agent, to obtain a heat-sensitive stencil sheet. The stencil sheet obtained was 1.3 $\mu$m in film thickness, 10 g/$m^2$ in the weight of the support, and 4.7 $\mu$m in fiber diameter.

The orientation parameter (R1) of the film of the stencil sheet was 6.3, and the orientation parameter of the support fibers was 6.5. The support surface of the stencil sheet was photographed by an electron microscope, and the number of web-like films exceeding 50 $\mu$m in diameter was counted and found to be 4 per 1 $mm^2$.

The stencil sheet was ◎ in all of perforability, printability and printing durability.

Comparative example 9

A heat-sensitive stencil sheet was obtained as described in Example 13, except that the bonding temperatures on both the film and nonwoven fabric sides were set at 105° C. The support surface of the stencil sheet was photographed using an electron microscope, and the number of web-like films exceeding 50 $\mu$m in diameter was counted and found to be 19 per 1 $mm^2$. The orientation parameter (R1) of the film of the stencil sheet was 2.8, and the orientation parameter (R2) of the support fibers was 5.0.

The stencil sheet was × in perforability, Δ in printability and ○ in printing durability.

Comparative example 10

A nozzle plate with 100 holes of 0.25 mm in diameter was used to spin polyethylene terephthalate ([η]=0.65, Tm=254° C.) at a melt temperature of 290° C., and the fibers were dispersed by an air ejector at a spinning speed of 4000 m/min, being collected on a conveyor. Then, they were embossed at a temperature of 200° C., to produce a nonwoven fabric of polyester fibers of 20 g/$m^2$ in weight.

Separately, the same polyester resin as used in Example 4 was used to produce a 1.3 $\mu$m thick biaxially stretched film.

The biaxially stretched film and the nonwoven fabric were made to overlap and thermally bonded by metallic calender rolls at a nip pressure of 20 kg/cm at a temperature of 150° C., and the laminate was coated on the film side with a silicone based releasing agent, to produce a heat-sensitive stencil sheet. The support surface of the stencil sheet was photographed using an electron microscope, and the number of web-like films of more than 50 $\mu$m in diameter was counted and found to be 0 per 1 $mm^2$. However, many embossed portions were observed. The orientation parameter (R1) of the film of the stencil sheet was 2.7, and the orientation parameter (R2) of the support fibers was 5.3.

The stencil sheet was × in perforability, × in printability and ○ in printing durability.

The results of all the Examples and the Comparative Examples are shown in the following Tables 1 and 2.

INDUSTRIAL APPLICABILITY

As can be seen from the above data, heat-sensitive stencil sheets embodying the present invention can be high in perforation sensitivity of the film, good in ink permeability and stable in the strength of the support. Therefore, the prints obtained using a stencil printing can provide highly precise and clear images, and the stencil is excellent in printing durability. Therefore, the present invention provides a useful heat-sensitive stencil sheet.

TABLE 1

| | Film/Fibers | Bonding roll temperature (° C.) Film side/Fiber side | Preheating Film side/Fiber side | Drawing ratio | Linear nip pressure | R1 | R2 |
|---|---|---|---|---|---|---|---|
| Example 1 | Cast film/Melt blow | 80/100 | –/– | 3.5/4.0 | 0.1 | 6.5 | 6.0 |
| Comparative Ex. 1 | Cast film/Melt blow | 80/80 | –/– | 3.5/4.0 | 0.1 | 4.0 | 2.8 |
| Comparative Ex. 2 | Cast film/Melt blow | 100/100 | –/– | 3.5/4.0 | 0.1 | 2.9 | 4.5 |
| Example 2 | Cast film/Melt blow | 80/90 | –/1 KW infrared heater | 3.5/4.0 | 0.1 | 6.0 | 5.8 |
| Comparative Ex. 3 | Cast film/Melt blow | 80/90 | –/– | 3.5/4.0 | 0.1 | 4.0 | 2.9 |
| Example 3 | Cast film/Melt blow | 90/100 | –/1 KW infrared heater | 3.5/4.0 | 0.1 | 6.4 | 6.3 |
| Comparative Ex. 4 | Cast film/Melt blow | 95/95 | –/1 KW infrared heater | 3.5/4.0 | 0.1 | 4.3 | 2.9 |
| Comparative Ex. 5 | Drawn film/Spun bond | 160° C. calender | — | — | — | 2.8 | 4.6 |
| Example 4 | Cast film/Melt blow | 80/95 | — | 3.5/4.0 | 1.0 | 6.4 | 6.2 |
| Example 5 | Cast film/Melt blow | 80/95 | — | 3.5/4.0 | 3.0 | 6.3 | 6.0 |
| Example 6 | Cast film/Melt blow | 80/95 | — | 3.5/4.0 | 5.0 | 6.3 | 6.1 |
| Example 7 | Cast film/Melt blow | 80/95 | — | 3.5/4.0 | 7.0 | 6.0 | 5.8 |
| Example 8 | Cast film/Melt blow | 80/95 | — | 3.5/4.0 | 10.0 | 5.4 | 5.1 |
| Comparative Ex. 6 | Cast film/Melt blow | 90/90 | — | 3.0/3.5 | 6.0 | 2.3 | 2.9 |
| Comparative Ex. 7 | Cast film/Melt blow | 80/80 | — | 3.5/4.0 | 0.1 | 4.2 | 2.9 |
| Example 9 | Cast film/Melt blow | 85/95 | –/1 KW infrared heater | 3.5/4.0 | 1.0 | 6.3 | 6.0 |
| Example 10 | Cast film/Melt blow | 85/95 | –/1.5 KW infrared heater | 3.5/4.0 | 1.0 | 5.7 | 5.5 |
| Example 11 | Cast film/Melt blow | 85/95 | –/2.0 KW infrared heater | 3.5/4.0 | 1.0 | 5.7 | 5.5 |
| Example 12 | Cast film/Melt blow | 85/95 | –/3.0 KW infrared heater | 3.5/4.0 | 1.0 | 5.1 | 4.9 |
| Comparative Ex. 8 | Cast film/Melt blow | 85/95 | — | 3.5/4.0 | 1.0 | 4.3 | 2.9 |
| Example 13 | Cast film/Melt blow | 90/100 | 93° C./105° C. | 3.5/4.0 | 1.0 | 6.3 | 6.5 |
| Comparative Ex. 9 | Cast film/Melt blow | 90/100 | 105° C./105° C. | 3.5/4.0 | 1.0 | 2.8 | 5.0 |
| Comparative Ex. 10 | Drawn Film/Spun bond | 150° C. calender | — | — | — | 2.7 | 5.3 |

TABLE 2

| | R1 | R2 | Number of Web-like Films | Perforability | Printability | Runnability | Printing durability |
|---|---|---|---|---|---|---|---|
| Example 1 | 6.5 | 6 | | | ◎ | ◎ | |
| Comparative Ex. 1 | 4 | 2.8 | | | ○ | x | |
| Comparative Ex. 2 | 2.9 | 4.5 | | | x | ◎ | |
| Example 2 | 6 | 5.8 | | | ◎ | ◎ | |
| Comparative Ex. 3 | 4 | 2.9 | | | ○ | x | |
| Example 3 | 6.4 | 6.3 | | | ◎ | ◎ | |
| Comparative Ex. 4 | 4.3 | 2.9 | | | ○ | x | |
| Comparative Ex. 5 | 2.8 | 4.6 | | | x | ○ | |
| Example 4 | 6.4 | 6.2 | 5 | ◎ | ◎ | | ◎ |
| Example 5 | 6.3 | 6 | 13 | ◎ | ○ | | ◎ |
| Example 6 | 6.3 | 6.1 | 25 | ◎ | ○ | | ◎ |
| Example 7 | 6 | 5.8 | 30 | ◎ | Δ | | ○ |
| Example 8 | 5.4 | 5.1 | 35 | ○ | Δ | | ○ |
| Comparative Ex. 6 | 2.3 | 2.9 | 50 | x | x | | x |
| Comparative Ex. 7 | 4.2 | 2.9 | — | ○ | ○ | | x |
| Example 9 | 6.3 | 6 | 3 | ◎ | ◎ | | ◎ |
| Example 10 | 5.7 | 5.5 | 17 | ◎ | ○ | | ◎ |
| Example 11 | 5.7 | 5.5 | 27 | ◎ | ○ | | ◎ |
| Example 12 | 5.1 | 4.9 | 36 | ○ | Δ | | ○ |
| Comparative Ex. 8 | 4.3 | 2.9 | 13 | ○ | ○ | | x |
| Example 13 | 6.3 | 6.5 | 4 | ◎ | ◎ | | ◎ |
| Comparative Ex. 9 | 2.8 | 5 | 19 | x | Δ | | ○ |
| Comparative Ex. 10 | 2.7 | 5.3 | 0 | x | x | | ○ |

We claim:

1. A heat-sensitive stencil sheet comprising a laminate of a fibrous support of polyester fibres and a polyester film, wherein, both the orientation parameter (R1) of the film and the orientation parameter (R2) of the fibers obtained by laser Raman spectroscopy are in a range of 3 to 10.

2. A heat-sensitive stencil sheet according to claim 1, wherein any web-like film portions of a diameter more than 50 $\mu$m which may have been formed in the fibrous support during formation of the laminate are present in an amount no more than 30 per 1 $m^2$.

3. A heat-sensitive stencil sheet according to claim 1, wherein the orientation parameter (R1) of the film is in a range of 3.5 to 10.

4. A heat-sensitive stencil sheet according to claim 1, wherein the orientation parameter (R2) of the fibers is in a range of 3.5 to 10.

5. A heat-sensitive stencil sheet according to claim 1, wherein the melting point of the polyester film is 230° C. or lower.

6. A heat-sensitive stencil sheet according to claim 1, wherein the melting point of the polyester fibers is higher than the melting point of the polyester film.

7. A heat-sensitive stencil sheet according to claim 1, wherein the thickness of the polyester film is 0.1 to 5 $\mu$m.

8. A heat-sensitive stencil sheet according to claim 1, wherein the crystal melting energy ($\Delta Hu$) of the polyester film is 10 to 50 J/g.

9. A heat-sensitive stencil sheet according to claim 1, wherein the average diameter of the polyester fibers is 0.5 to 20 $\mu$m.

10. A heat-sensitive stencil sheet according to claim 1, wherein the weight of the fibrous support is 1 to 20 $g/m^2$.

* * * * *